(12) United States Patent
Shimmachi et al.

(10) Patent No.: US 8,477,391 B2
(45) Date of Patent: Jul. 2, 2013

(54) IMAGE READING APPARATUS

(75) Inventors: Masaya Shimmachi, Kawasaki (JP); Haruo Ishizuka, Ichikawa (JP); Kuniaki Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 657 days.

(21) Appl. No.: 12/187,804

(22) Filed: Aug. 7, 2008

(65) Prior Publication Data

US 2009/0040572 A1 Feb. 12, 2009

(30) Foreign Application Priority Data

Aug. 10, 2007 (JP) ................. 2007-209195

(51) Int. Cl.
*H04N 1/04* (2006.01)
*H04N 1/21* (2006.01)
*H04N 1/00* (2006.01)
*G06K 15/00* (2006.01)
*G06M 7/00* (2006.01)
*G03G 15/00* (2006.01)

(52) U.S. Cl.
USPC .......... 358/497; 358/474; 358/1.14; 358/296; 358/498; 358/401; 377/8; 399/81

(58) Field of Classification Search
USPC .. 358/497, 1.14, 296, 498; 713/320; 399/370; 271/274
See application file for complete search history.

(56) References Cited

U.S. PATENT DOCUMENTS

| 5,841,547 | A | * | 11/1998 | Takemoto et al. | 358/296 |
| 6,009,303 | A | * | 12/1999 | Kumagai et al. | 399/370 |
| 7,631,208 | B2 | * | 12/2009 | Ishida | 713/320 |
| 2007/0257422 | A1 | * | 11/2007 | Suzuki | 271/225 |

FOREIGN PATENT DOCUMENTS

| JP | 09-012196 A | 1/1997 |
| JP | 2004-196452 A | 7/2004 |
| JP | 2005-086217 A | 3/2005 |
| JP | 2005-277533 | 10/2005 |
| JP | 2006-103840 A | 4/2006 |

* cited by examiner

*Primary Examiner* — Charlotte M Baker
*Assistant Examiner* — Rury Grisham
(74) *Attorney, Agent, or Firm* — Canon USA, Inc., IP Division (57) ABSTRACT

An image reading apparatus includes a document reading and conveying unit, a pressing plate capable of moving to a position to press a document against a reading surface and to a position withdrawn from the reading surface, and a fixed reader configured to read a document fixed on the reading surface by moving a close-coupled image sensor relative to the document. The document reading and conveying unit includes a controller configured to perform pickup initialization of returning a pickup roller to an initial position after the completion of conveying one or more documents and is supported by the pressure plate. The controller includes a first timer configured to measure an elapsed time from the completion of reading performed by the fixed reader. The controller performs the pickup initialization after a measurement value measured by the first timer exceeds a first time.

8 Claims, 8 Drawing Sheets

IMAGE READING APPARATUS

BACKGROUND OF THE INVENTION

1. Field of the Invention

The present invention relates to an image reading apparatus for separating stacked documents, conveying them one by one, and reading a document.

2. Description of the Related Art

There exist image reading apparatuses, such as a scanner and a scanner portion used in an image forming apparatus (e.g., a copier or a facsimile machine). One known example of an image reading apparatus of this kind includes a supporting portion for supporting sheet documents stacked thereon, a document conveying device for separating and conveying stacked documents one by one, and a flatbed scanner for reading a document conveyed one by one by the document conveying device. The document conveying device includes a document pickup portion that has a pickup roller for drawing one or documents from the supporting portion and a separating portion for separating the documents drawn by the pickup roller one by one. The flatbed scanner includes a document pressing plate for pressing a document against a reading surface and fixing it (hereinafter referred to as a pressing plate). The pressing plate can be freely closed and opened so as to be movable to a close position where it presses a document against the reading surface and to an open position where it withdraws from the reading surface.

Among such image reading apparatuses, one type of an image reading apparatus in which a document conveying device is disposed on a pressing plate suffers from impacts or vibrations on a document pickup portion occurring in an operation for opening or closing the pressing plate. An impact on the document pickup portion leads to a change in the position of the pickup roller, thus making it difficult to set documents on a supporting portion. One example approach to preventing this problem is a structure disclosed in Japanese Patent Laid-Open No. 2005-277533. This structure includes a sensor for detecting an operating of opening or closing a pressing plate and executes initialization of returning a pickup roller of a document pickup portion to an initial position upon detection of the operation of opening or closing the pressing plate by the sensor. However, the sensor for detecting opening/closing of the pressing plate in the structure described in Japanese Patent Laid-Open No. 2005-277533 leads to an increase in the cost of manufacturing the image reading apparatus.

Additionally, the structure described in Japanese Patent Laid-Open No. 2005-277533 does not detect opening or closing of the pressing plate when an output from the sensor for detecting opening or closing the pressing plate is not detected in a power-saving mode to which the image reading apparatus is switched from a normal mode. Therefore, if the pressing plate is opened or closed in the power-saving mode, initialization for the pickup roller is not triggered, so the initialization is not executed.

Similarly, if the pickup roller of the document pickup portion is changed by its own weight when the image reading apparatus is in a stand-by state for a long time while closing the pressing plate, the initialization for the pickup roller is not triggered, so the initialization is not executed.

SUMMARY OF THE INVENTION

The present invention provides an image reading apparatus capable of preventing or reducing a change in the position of a pickup roller, for example, an impact caused by its own weight in a standby state by use of initialization, and as a result, reducing cost.

According to an aspect of the present invention, an image reading apparatus includes a supporting unit, a pickup roller, a separator, a document pressing plate, a reader, a measuring unit, and a control unit. The supporting unit is configured to support one or more sheet documents. The pickup roller is configured to draw the one or more documents from the supporting unit. The separator is configured to separate the one or more documents drawn by the pickup roller one by one. The document pressing plate is capable of moving to a pressing position to press the one or more documents against a reading surface and to a withdrawn position withdrawn from the reading surface. The reader is configured to read a document placed on the reading surface. The measuring unit is configured to measure an elapsed time from completion of reading performed by the reader. The control unit is configured to control the pickup roller to be maintained at an initial position when the one or more documents are placed on the supporting unit. The control unit is configured to control the pickup roller to move to a contact position at which the pickup roller is in contact with at least one of the documents placed on the supporting unit when the one or more documents are drawn from the supporting unit and to send the drawn documents to the separator. The control unit is configured to control the separator to separate and convey the sent documents one by one and configured to perform initialization of returning the pickup roller to the initial position after completion of conveying the one or more documents. The control unit is configured to perform the initialization after a measurement value measured by the measuring unit exceeds a first time $t1$.

Further features and aspects of the present invention will become apparent from the following description of exemplary embodiments (with reference to the attached drawings).

DESCRIPTION OF THE EMBODIMENTS

Exemplary embodiments of the present invention will be described below with reference to the drawings.

An image reading apparatus according to an embodiment of the present invention can be provided in a main body of an image forming apparatus (e.g., a copier, a printer, a facsimile machine, or a multifunction peripheral) as part of components of the image forming apparatus in some cases. Information read by the image reading apparatus is formed as an image on a recording material (e.g., a recording sheet) by an image forming unit of the image forming apparatus. That is, an image read by the image reading apparatus can be copied on a recording material by the image forming unit and can also be transmitted to an external device via a communications unit.

The dimensions, materials, shapes, and relative arrangement of components described in the embodiments below are to be changed in accordance with a structure of an apparatus to which the present invention is applied. It is not intended to limit the scope of the present invention to the description in the embodiments only, unless otherwise specified.

An image reading apparatus according to an embodiment will be described below with reference to the drawings. In the present embodiment, an automatic sheet feeding and reading apparatus is described as one example of an image reading apparatus to which the present invention is applied, the image reading apparatus including a document feeding device.

Figure 1:
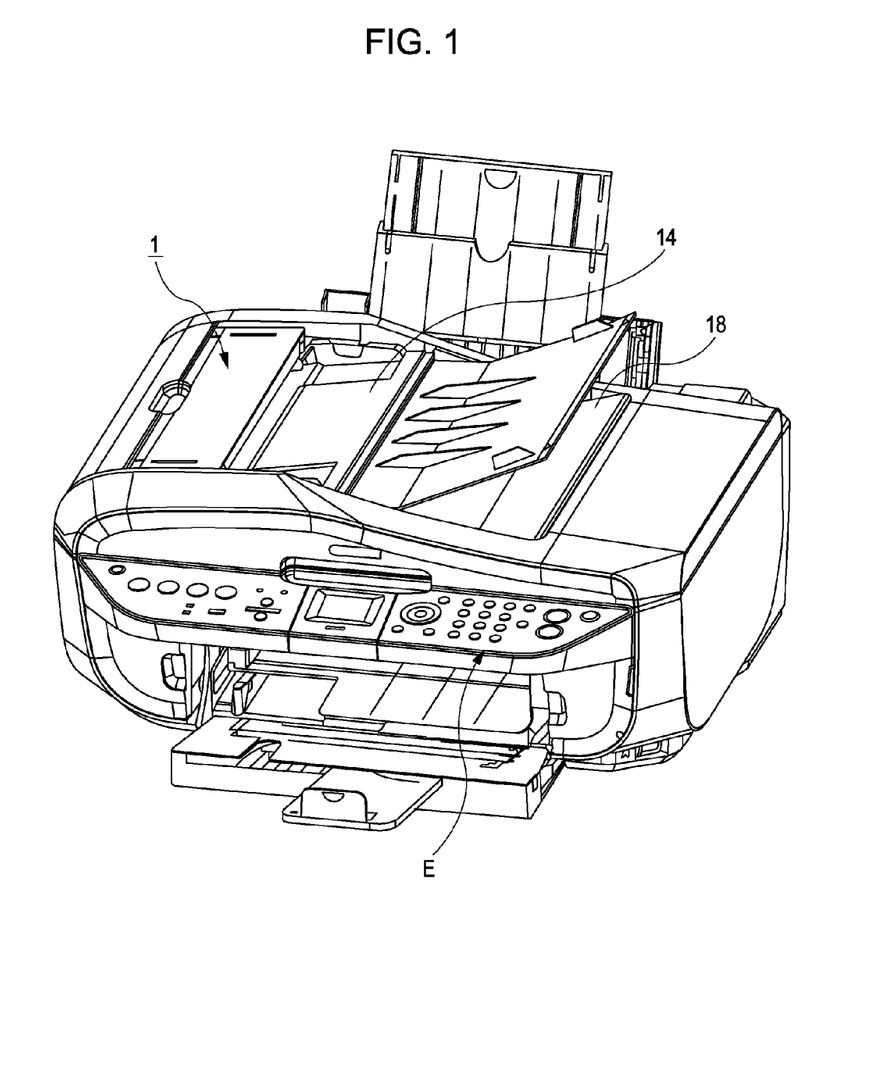
FIG. 1 is a perspective view that shows an outer appearance of an automatic sheet feeding and reading apparatus according to an embodiment of the present invention.
Figure 2:
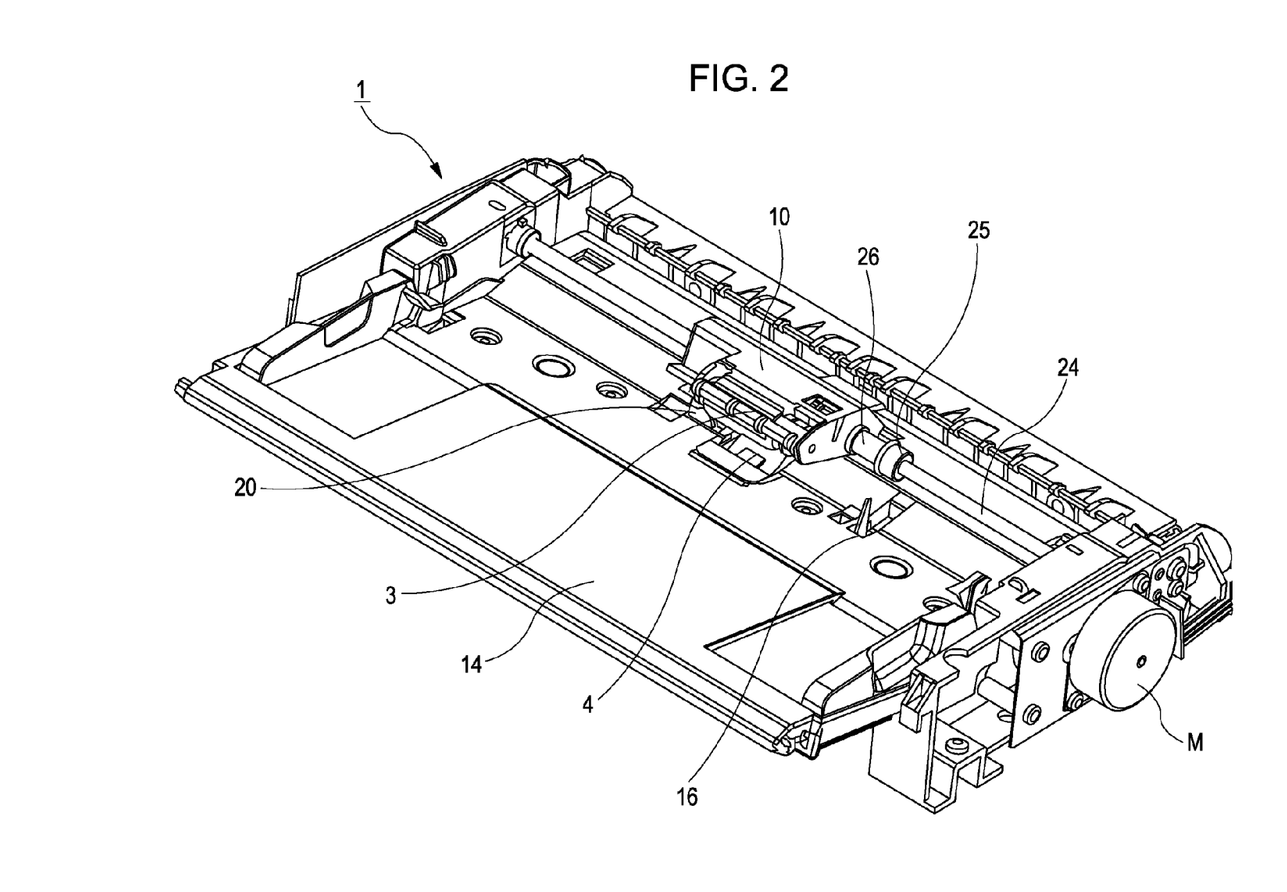
FIG. 2 is a perspective view of a document pickup section of the automatic sheet feeding and reading apparatus according to one embodiment.
Figure 3:
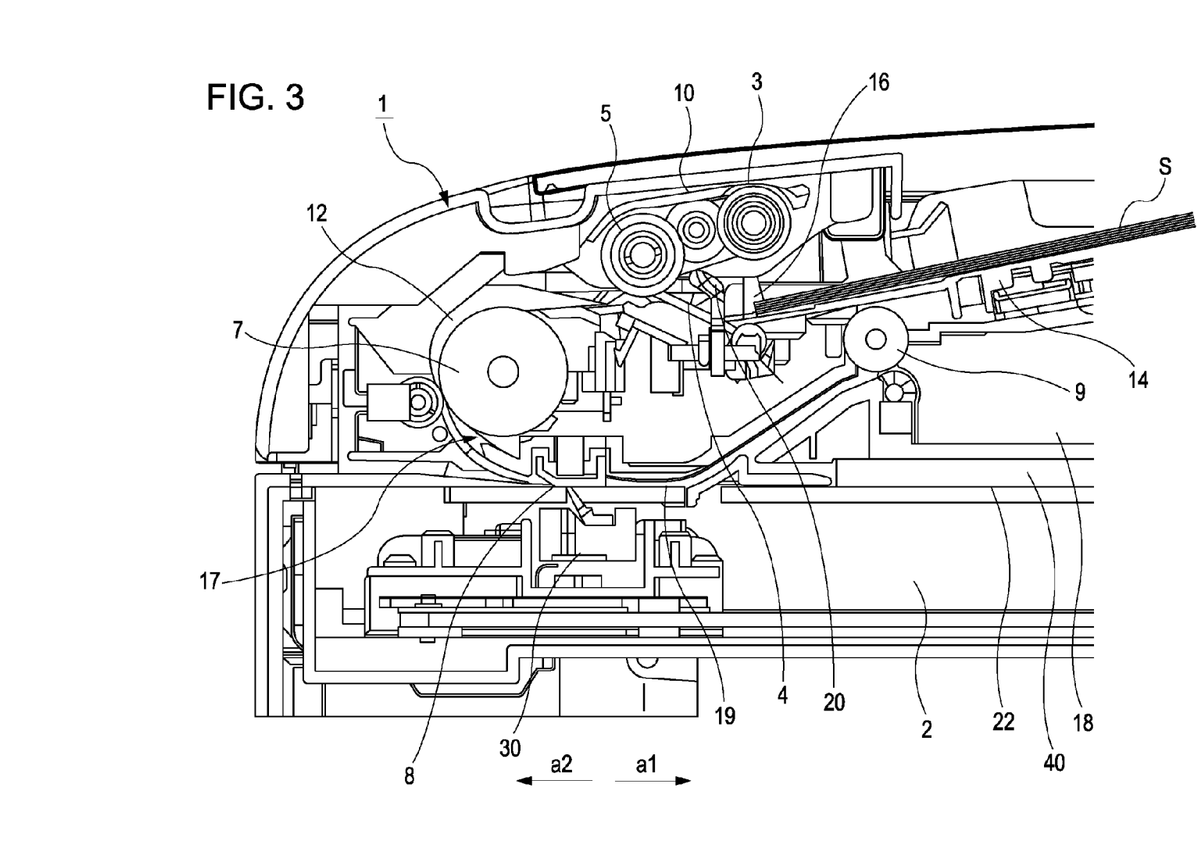
FIG. 3 is a cross-sectional view of a document reading and conveying unit of the automatic sheet feeding and reading apparatus according to one embodiment, illustrated from the front side.

FIG. 1 is an external perspective view of an automatic sheet feeding and reading apparatus according to the present embodiment. FIG. 2 is a perspective view of a document pickup section of the automatic sheet feeding and reading apparatus according to the present embodiment. FIG. 3 is a cross-sectional view of a document reading and conveying unit of the automatic sheet feeding and reading apparatus according to the present embodiment, illustrated from the front side. First, an exemplary structure and operation of the document reading and conveying unit 1 is described.

As illustrated in FIGS. 1 to 3, the document reading and conveying unit 1, serving as a document conveying device, includes a substantially U-shaped document conveying path (hereinafter referred to as a U-turn path) 12 along which a sheet document S is conveyed. A separation roller 5, a separation pad 4, a document presence sensor 16 configured to detect the presence or absence of a document S, a first conveying roller 7 configured to convey a document S, and a document edge sensor 17 configured to detect the leading end and the rear end of a document S are disposed along the U-turn path 12.

The document reading and conveying unit 1 is connected to a document placement tray 14 adjacent to an upstream end of the U-turn path 12. The document placement tray 14 serves as a supporting unit configured to support a plurality of documents S stacked thereon. A document pressing plate (hereinafter referred to as a pressing plate) 40 configured to press and fixing a document S and a document output tray 18 integral with the pressing plate 40 are disposed adjacent to a downstream end of the U-turn path 12. The pressing plate 40 is closable and openable so as to be movable to a close position where it presses a document S against a reading surface and to an open position where it withdraws from the reading surface. The document reading and conveying unit 1 is supported on the pressing plate 40.

A document stopper 20 configured to regulate the leading end of documents S stacked on the document placement tray 14 and the document presence sensor 16 configured to detect the presence or absence of a document S are disposed adjacent to the upstream end of the U-turn path 12. A pickup roller 3 configured to draw one or more upper documents S from the document tray 14 by coming into contact with the uppermost document S is also disposed adjacent to the upstream end of the U-turn path 12. The separation roller 5 and the separation pad 4 are also disposed adjacent to the upstream end of the U-turn path 12. The separation roller 5 and the separation pad 4 are pressed into contact with each other and serve as a separator configured to separate the documents S drawn by the pickup roller 3 one by one. A second conveying roller 9 configured to output a document S to the document output tray 18 is disposed adjacent to the downstream end of the U-turn path 12.

The automatic sheet feeding and reading apparatus according to the present embodiment includes a fixed reader (flatbed scanner) 2 serving as a reader configured to read a document placed and fixed on a document reading surface of a flatbed glass 22. The fixed reader 2 includes a close-coupled image sensor 30 serving as a reading sensor. The flatbed glass 22 is disposed between the close-coupled image sensor 30 and the document reading and conveying unit 1. The close-coupled image sensor 30 irradiates an image information surface of a document S with light emitted from a light-emitting diode (LED) serving as a light source. The light reflected from the image information surface is imaged on a sensor element through a self-focusing rod lens array. In such a way, image information is read.

The close-coupled image sensor 30 is supported so as to be movable in the directions indicated by the arrows a1 and a2 illustrated in FIG. 3. In reading a document S placed and fixed on the reading surface of the flatbed glass 22 (in scanning performed by the flatbed scanner), the close-coupled image sensor 30 reads the document S while scanning in the direction of the arrow a1 in FIG. 3. In reading a document S with the document reading and conveying unit 1, the close-coupled image sensor 30 stays in a reading position illustrated in FIG. 3 (a position that faces a reading white background plate 8) and reads a document being conveyed to this reading position.

A document S is set on the document tray 14 in the document reading and conveying unit 1 by a user such that the document S is inserted as far as it will go from the right to the left (in the direction of the arrow a2) in FIG. 3 and the surface on which an image is formed of the document S is placed face up. In this document setting operation, the leading end of the document S is regulated by the document stopper 20, and the presence of the document S is detected by the document presence sensor 16.

When a user selects a first document reading mode by use of an operation unit E (FIG. 1) and instructs the apparatus to start reading, a motor M (FIG. 2) is then rotated. The driving force from the motor M is transmitted to a separation roller shaft 24 through a gear train (not shown), thus driving the separation roller shaft 24. A clutch spring 26, which is a compression spring, is disposed between a clutch hub 25 fixed on the separation roller shaft 24 and a pickup arm 10. The frictional force F produced by the pressing force of the clutch spring 26 holds the pickup arm 10 by friction.

When the motor M is rotated forward, the separation roller shaft 24 is also rotated forward (clockwise in FIG. 3), and the frictional force F transmitted from the clutch hub 25 drives the pickup arm 10 such that the pickup roller 3 is pressed against a document S. At this time, the pickup roller 3 and the separation roller 5 are rotated clockwise in FIG. 3, and the first conveying roller 7 and the second conveying roller 9 are rotated counterclockwise in FIG. 3. They are coupled with a drive train (not shown) so as to be rotatable in such a way.

When the motor M is rotated backward, the separation roller shaft 24 is also rotated backward (counterclockwise in FIG. 3), and the frictional force F moves the pickup arm 10 upward. When the motor M stops in this state, the pickup roller 3 stops in a state where the pickup roller 3 can receive documents S.

When the pickup arm 10 presses documents S, the document stopper 20 is pressed downward by the pickup arm 10. One or more documents S are made to pass along an inclined surface of the document stopper 20 by the pickup roller 3 and sent to the inside of the U-turn path 12. At this time, in the document reading and conveying unit 1, the documents S are separated one by one by the separation roller 5 and the separation pad 4, and the uppermost document S is conveyed. The document S is conveyed along the U-turn path 12, and it is further conveyed to the location of the close-coupled image sensor 30 of the fixed reader 2 by the first conveying roller 7.

In the document reading and conveying unit 1, when the document edge sensor 17 detects the leading end of a document S, reading of image information performed by the close-coupled image sensor 30 while the document S is conveyed starts at the location where the document S is conveyed by a predetermined amount from the location where the leading end is detected. In this reading operation, the close-coupled image sensor 30 reads image information while the document S is conveyed. At this time, the document S is pressed onto an automatic document feeder (ADF) glass 19 by the reading white background plate 8. After the start of reading, the document S is conveyed toward the second conveying roller 9. Then, when the rear end of the document S is detected by the document edge sensor 17, reading of image information performed by the close-coupled image sensor 30 is completed at the location where the document S is conveyed by a predetermined amount from the location where the rear end is detected.

When the document presence sensor 16 detects the presence of the next document, the document reading and conveying unit 1 continues conveying the document S and reads the image information by use of the close-coupled image sensor 30. The intervals between documents are determined by, for example, the difference between the peripheral speed of the first conveying roller 7 and that of the separation roller 5, a mechanical timer provided on the pickup roller 3 or the separation roller 5, and a slippage occurring in conveying performed by the first conveying roller 7, the separation roller 5, or the pickup roller 3. The intervals between documents are also determined by the amount of the next document being drawn between the document stopper 20 and the separation pad 4.

When the document presence sensor 16 detects the absence of the next document, the last document S is conveyed toward the document output tray 18 by the second conveying roller 9. In such a way, the document reading and conveying unit 1 repeats the reading operation described above until the document presence sensor 16 detects the absence of a document.

Next, an exemplary structure of a controller serving as a control unit included in the automatic sheet feeding and reading apparatus according to the present embodiment will be described below.

The controller includes a system control substrate used for controlling mainly the entire system of the apparatus, a printer control substrate used for controlling mainly a recording system, and an operation control substrate in which a power-supply unit configured to supply power to the apparatus, operational keys of an operation panel, and an LED are implemented.

The controller controls the pickup roller 3 to be maintained at an initial position remote from documents S when the documents S are placed on the document placement tray 14. The controller controls the separation roller 5 and the separation pad 4 to separate and convey the documents S one by one by controlling the pickup roller 3 to move to the contact position where the pickup roller 3 is in contact with at least one of the placed documents S in drawing the documents S from the document placement tray 14 and to sent the drawn documents to the separation roller 5 and the separation pad 4. The controller performs control such that an operation of returning the pickup roller 3 to the initial position (hereinafter referred to as pickup initialization) is executed after the completion of conveying the documents S.

The controller includes a second timer B serving as a measuring unit configured to measure the time elapsed from the completion of reading performed by the fixed reader 2 (hereinafter referred to sometimes as flatbed scanning). The controller further includes a nonvolatile memory (not shown) serving as a storing unit configured to store the time that pickup initialization is completed as the initial value and a first timer A serving as a measuring unit configured to measure the elapsed time from the initial value stored by the nonvolatile memory.

The controller performs control such that pickup initialization is executed after a measurement value measured by the second timer B exceeds a first time t1. When the fixed reader 2 reads a document S before the first time t1 elapses, the controller controls the second timer B to restart measuring an elapsed time from the completion of reading performed by the fixed reader 2 (flatbed scanning). The controller performs control such that pickup initialization is executed when the elapsed time from the initial value stored by the nonvolatile memory exceeds a second time t2. The details of these control processes will be described later.

Figure 4:
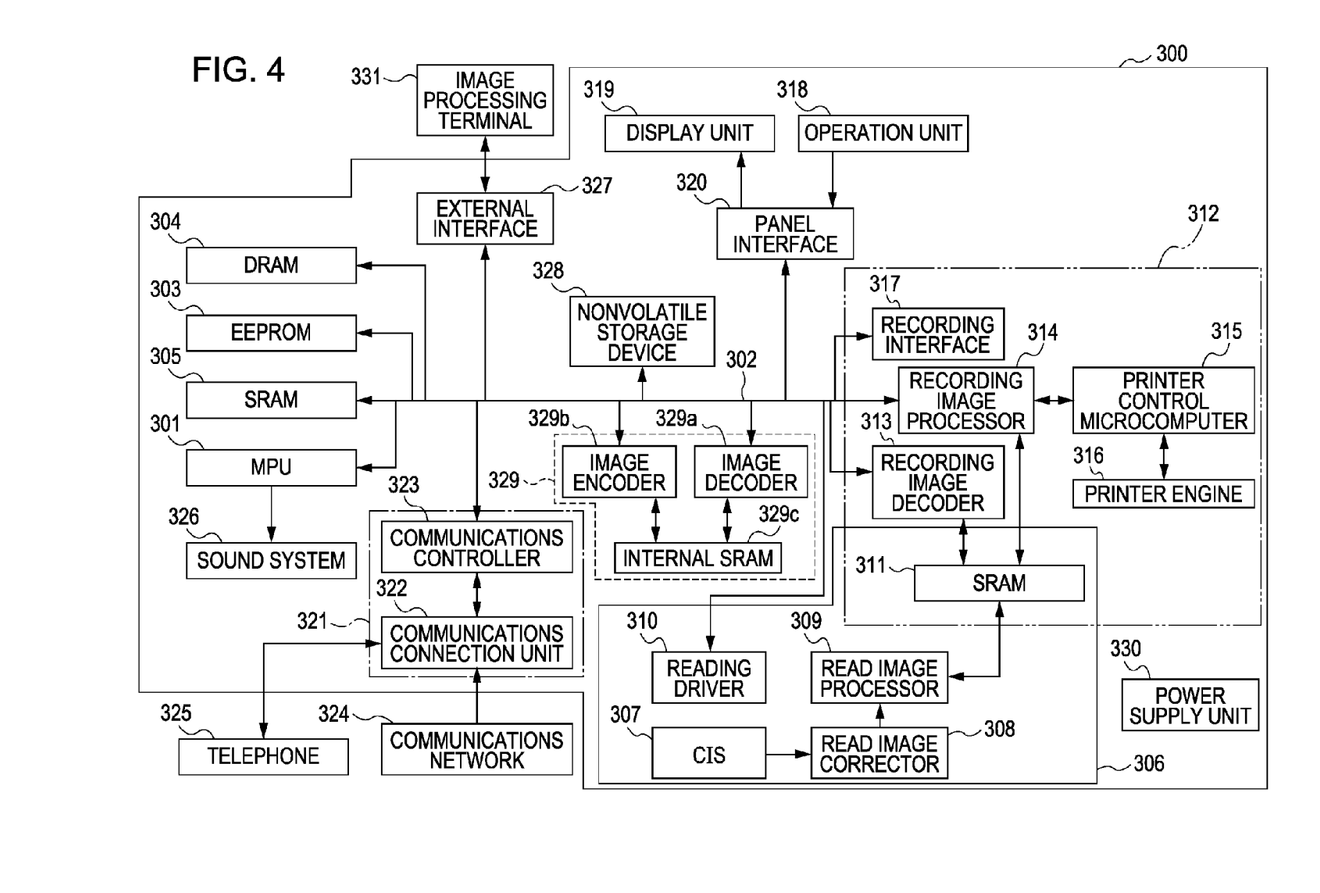
FIG. 4 is a control block diagram of the automatic sheet feeding and reading apparatus according to one embodiment.

Next, an exemplary structure of a control system of a facsimile machine, the control system being included in the automatic sheet feeding and reading apparatus, will be described below with reference to the block diagram illustrated in FIG. 4. As illustrated in FIG. 4, the facsimile machine 300 includes a microprocessor unit (MPU) 301 for controlling the entire apparatus via a system bus 302, an electrically erasable programmable read-only memory (EEPROM) 303, a dynamic random access memory (DRAM) 304, and a static random access memory (SRAM) 305.

Program code for operation of the MPU 301, initial value data, table data, a table for image reading modes, and a threshold value for intervals between documents are stored in the EEPROM 303. The DRAM 304 is used as an image buffer and image memory and also used as a buffer for temporarily storing data in exchanging data with an image processing terminal 331. The DRAM 304 is also used as a memory for storing, in the form of a file, image data received via a communications portion 321, image data obtained by reading performed by a reading portion 306, and image data transmitted from the image processing terminal 331. The SRAM 305 is used as a user registration data area and a work area. The DRAM 304 and the SRAM 305 are battery backed, so that they are protected against accidental failure, such as a power outrage.

The reading portion 306 included in the facsimile machine includes a contact image sensor (CIS) 307, a read image corrector 308, a read image processor 309, a reading driver 310, and a SRAM 311. The reading portion 306 moves the CIS 307 by driving the reading driver 310, optically reads information by use of the CIS 307, and converts it into an electrical image signal. The signal is subjected to shading correction performed by the read image corrector 308. Then, the signal is subjected to image processing performed by the read image processor 309, and the resultant high-definition image data is output. The SRAM 311 is used as a buffer for use in image processing.

The facsimile machine further includes an ink jet recording portion 312. The ink jet recording portion 312 includes the SRAM 311, a recording image decoder 313, a recording image processor 314, a printer control microcomputer 315, a printer engine 316, and a recording interface 317. The recording image decoder 313 converts run-length image data into raw image data. The recording image processor 314 converts raw image data into high-definition image data by performing image processing, such as resolution conversion, scaling, smoothing, and density correction, on the raw image data. The SRAM 311 is used as a buffer for use in these data conversion processes. The printer control microcomputer 315 includes a recording control MPU for controlling each operation of the ink jet recording portion 312, a ROM in which instructions for controlling recording are described, and a reading unit configured to read an instruction from the ROM, which are not illustrated in FIG. 4. The printer control microcomputer 315 also includes a processor for processing an instruction read by the reading unit, a RAM capable of receiving an input for storing information required by the processor, and an output unit configured to output a signal generated by the processor. The printer control microcomputer 315 inputs and outputs a signal for controlling recording performed by the printer engine 316 by use of the above-described processes. The recording interface 317 is an interface for cooperation between the printer control microcomputer 315 and the MPU 301.

The facsimile machine includes an operation unit 318, a display unit 319, a panel interface 320, and the communications portion 321. The operation unit 318 has various keys and switches, including a numeric keypad, and receives instructions for operations to the apparatus and various kinds of information. The display unit 319 includes a liquid crystal display (LCD) and an LED and displays a status of the apparatus. The panel interface 320 is an interface for cooperation among the MPU 301, the operation unit 318, and the display unit 319. The communications portion 321 includes a communications connection unit 322 (e.g., a line connecting device) and a communications controller 323 (e.g., a modulator/demodulator) and performs line control.

The facsimile machine further includes a sound system 326, an external interface 327, a nonvolatile storage device 328, and an image encoding and decoding portion 329 and is connected to a communications network 324 and a telephone 325. The sound system 326 includes a speaker for informing a user of various statuses by sound. The external interface 327 enables data exchange between the MPU 301 and the image processing terminal 331, thus enabling control of the apparatus from the image processing terminal 331. The nonvolatile storage device 328 is a mass nonvolatile memory used for storing image information, and information stored therein is not erased when the power is turned off. The image encoding and decoding portion 329 includes an image decoder 329a, an image encoder 329b, and an internal SRAM 329c, which are used for image decoding and encoding of image data.

The facsimile machine further includes a power supply unit 330 configured to supply the power to the apparatus and is connected to the image processing 331. The image processing terminal 331 is a terminal of, for example, a computer connected to the apparatus.

Exemplary operations according to the present embodiment are described with a PC scanning operation, a copying operation, a facsimile receiving operation, and a printing operation.

PC Scanning Operation

Image information of a document read by the CIS 307 of the reading portion 306 is subjected to shading correction or other processing performed by the read image corrector 308. The corrected image data is further subjected to binarization and image conversion performed by the read image processor 309, and the resultant image data is input to the image encoder 329b of the image encoding and decoding portion 329. The input image data is developed in the internal SRAM 329c, encoded by the image encoder 329b, and stored in the DRAM 304. At the same time, management information for the image data is stored in the SRAM 305. The encoded image data stored in the DRAM 304 is decoded by the image decoder 329a of the image encoding and decoding portion 329 and developed as image data in the internal SRAM 329c. The developed image data is output to the image processing terminal 331 through the external interface 327.

Copying Operation

Image information of a document read by the CIS 307 of the reading portion 306 is subjected to shading correction or other processing performed by the read image corrector 308. The corrected image data is further subjected to binarization and image conversion performed by the read image processor 309, and the resultant image data is input to the image encoder 329b of the image encoding and decoding portion 329. The input image data is developed in the internal SRAM 329c, encoded by the image encoder 329b, and stored in the DRAM 304. At the same time, management information for the image data is stored in the SRAM 305. The encoded image data stored in the DRAM 304 is decoded by the image decoder 329a of the image encoding and decoding portion 329 and developed as image data in the internal SRAM 329c. The developed image data is subjected to correction and image conversion performed by the recording image processor 314. After that, the resultant image data is printed on recording paper by the printer engine 316 under the control of the printer control microcomputer 315.

Facsimile Receiving Operation

When a fax arrives, reception data is input to the communications controller 323 via the communications connection unit 322. Then, a procedure signal for facsimile communication is exchanged. After that, reception of image data starts. The image data is decoded by the communications controller 323. The decoded image data is transferred to a reception buffer of the DRAM 304 on a byte-by-byte basis under the control of the MPU 301 in response to a signal for input interruption from the communications controller 323. The reception data transferred to the reception buffer is decoded by the image decoder 329a of the image encoding and decoding portion 329 and is subjected to image error checking. The resultant data is developed as image data in the internal SRAM 329c. The developed image data is subjected to correction and image conversion performed by the recording image processor 314. After that, the resultant image data is printed on recording paper by the printer engine 316 under the control of the printer control microcomputer 315.

Printing Operation

A command and reception parameters are transmitted from the image processing terminal 331 to the external interface 327 on a byte-by-byte basis. The command and reception parameter received by the external interface 327 are transferred to the reception buffer of the DRAM 304 on a byte-by-byte basis under the control of the MPU 301 in response to a signal for input interruption from the external interface 327. Command code for identifying each command and the size of the following reception parameter are stored in the command. A set value necessary for executing operation to each command and image data are stored in the reception data. The command and the reception parameter transferred to the reception buffer except for image data are processed by the MPU 301.

When the content of the reception parameter is image data, encoded data or raw data constituting the image data is decoded by the image decoder 329a of the image encoding and decoding portion 329 based on image data format information represented by a previously received reception parameter. The decoded image data is developed as image data in the internal SRAM 329c. The developed image data is encoded by the image encoder 329b of the image encoding and decoding portion 329. The encoded image data is stored in the DRAM 304, and management information for the image data is stored in the DRAM 304. After the command is received, a response to the command and a transmission parameter are generated and transmitted.

Examples of the response include an OK response indicating that the received command is accepted, an NG response indicating that the received command is not accepted because the command is incorrect, and a BUSY response indicating that it is impossible to accept the received command at present because the apparatus is in operation or from other reasons. Examples of the transmission parameter include a result of transmission, a result of printing, a property of a file or a page, apparatus information supporting a command to be executed, a request for discontinuation, and a request for retransmission. The response is set in a transmission buffer in the DRAM 304 by the MPU 301. The response is transferred to the external interface 327 on a byte-by-byte basis under the control of the MPU 301 in response to a signal for input interruption from the external interface 327. After that, the response is transmitted to the image processing terminal 331.

A monitoring unit configured to monitor the amount of free space remaining in a buffer memory on the DRAM 304 may be included. In this case, when a predetermined amount of image buffer is not present when reading of documents is completed, the intervals between documents can be determined and the document reading mode can be changed based on the determined intervals. For example, the determination can be made only when the amount of free space remaining in the buffer memory is smaller than the amount of space for one page in Joint Photographic Experts Group (JPEG) format. This enables the following documents to be continuously read without changing the document reading mode if sufficient free space remains in the buffer for documents even when the intervals between documents are small.

Next, exemplary pickup initialization controlled by the controller described above will be described with reference to FIGS. 5, 6, and 7.

Figure 5:
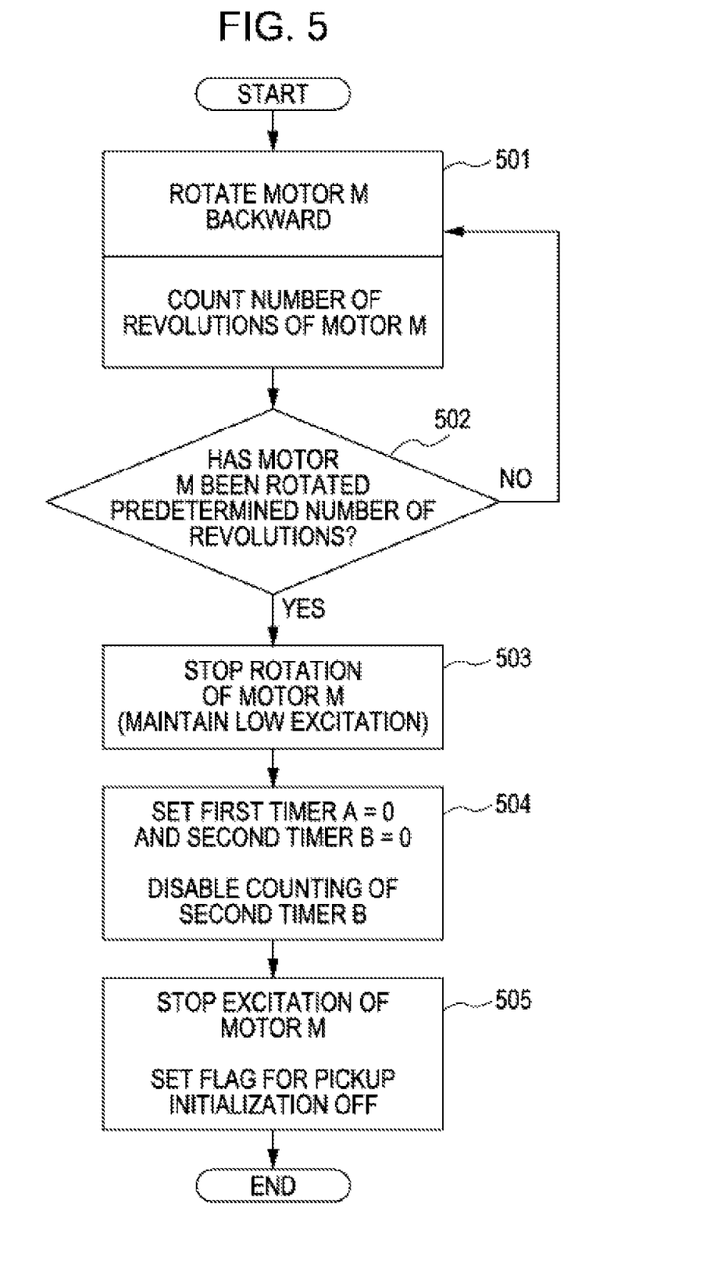
FIG. 5 is a flowchart for describing an exemplary pickup initialization process.

First, an operation of returning the pickup roller 3 to the initial position (pickup initialization) is described with reference to FIG. 5. As illustrated in FIG. 5, when the routine for pickup initialization starts, in step 501, the motor M is rotated backward by a predetermined number of revolutions (the number corresponding to the initialization). In step 502, it is determined whether the predetermined number of revolutions of the motor M has been completed. If the motor M has been rotated the predetermined number of revolutions (YES in step 502), flow proceeds to step 503. If the motor M has not been rotated the predetermined number of revolutions (NO in step 501), flow returns to step 501. In step 503, the rotation of the motor M is stopped, low excitation is maintained. Then, flow proceeds to step 504, where the first timer A and the second timer B, which serve the measuring unit, are both reset to zero, and the counting of the second timer B is disabled. Subsequently, flow proceeds to step 505, where the excitation of the motor M is stopped to de-energize the motor M. After that, the flag for pickup initialization is set off.

Next, an exemplary process for checking the pickup roller 3 will be described with reference to FIG. 6. The automatic sheet feeding and reading apparatus according to the present embodiment is AC powered. When connected to an AC power supply, the automatic sheet feeding and reading apparatus can operate in three modes: the normal mode, the power-saving mode, and the soft power-off mode. In the present embodiment, the controller controls switching among the three modes of the normal mode, the power-saving mode, and the soft power-off mode.

The state in which the apparatus is merely connected to the AC power supply is the soft power-off state. In this soft power-off state, the timers within the apparatus perform counting, whereas the external interface 327 and all sensors of the operation unit E except the power button are electrically disconnected. The soft power-off is the mode at which the apparatus is in a standby status with the minimum power consumption. The state in which the apparatus is running upon the pressing of the power button of the operation unit E is the normal mode. In this normal mode, all operations are accepted.

When an operation to the apparatus or an operation, such as printing, occurring in the normal mode finishes, a third timer C is reset and made to start counting. When the third timer C exceeds a predetermined time t3 (e.g., 5 minutes), which is a third time, the normal mode is switched to the power-saving mode, which suppresses power consumption. The third time t3 is longer than the first time t1 and shorter than the second time t2.

In the power-saving mode, the operating frequency of the MPU 301 is reduced by backlighting shutoff of the display unit, and circuits that do not operate in the standby state, such as the read image corrector 308, the read image processor 309, and the recording image processor 314, are electrically disconnected, thereby reducing power consumption. However, in the power-saving mode, an input from operational buttons of the operation unit E and the document presence sensor 16 can be detected, and the external interface 327 is operating so that the automatic sheet feeding and reading apparatus can return in a relatively short time when a request to use the automatic sheet feeding and reading apparatus is made.

Figure 6:
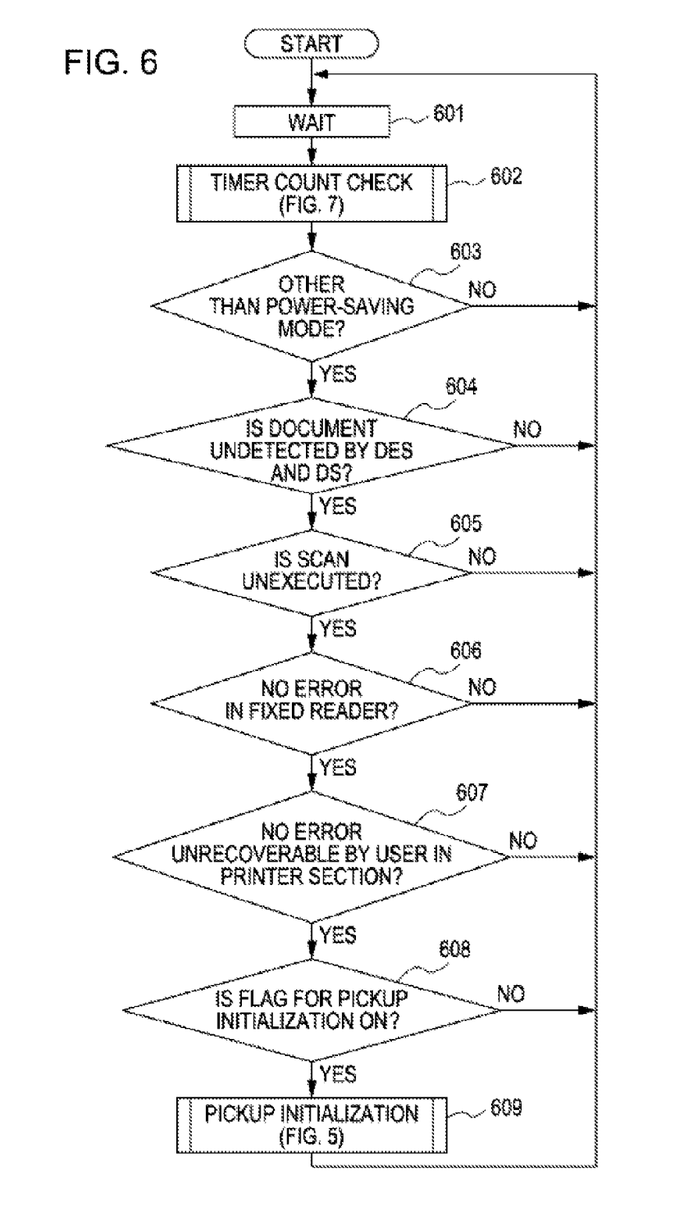
FIG. 6 is a flowchart for describing an exemplary checking process for the pickup initialization.

FIG. 6 illustrates control regularly occurring in the normal mode or the power-saving mode when the soft power-off state is switched to the power-on state upon the pressing of the power button of the operation unit E. After a process begins, as illustrated in FIG. 6, first, in step 601, the apparatus waits by a predetermined time (e.g., 0.5 second). Then, in step 602, timer count checking is called. If all conditions described below (steps 603 to 608) are determined to be "YES," flow proceeds to step 609. In step 609, the pickup initialization illustrated in FIG. 5 is called and executed. Then, flow returns to step 601, where regular monitoring continues.

When the following conditions are all determined to be YES, flow proceeds to step 609.
In step 603: Does the apparatus operate in the mode other than the power-saving mode?
In step 604: Is any document S undetected by the document presence sensor (DS) 16 and the document edge sensor (DES) 17?
In step 605: Is a scan operation unexecuted by the fixed reader 2?
In step 606: Is there no error occurring in the fixed reader 2?
In step 607: Is there no error unrecoverable by a user occurring in the printer section?
In step 608: Is the flag for pickup initialization on?

Figure 7A:
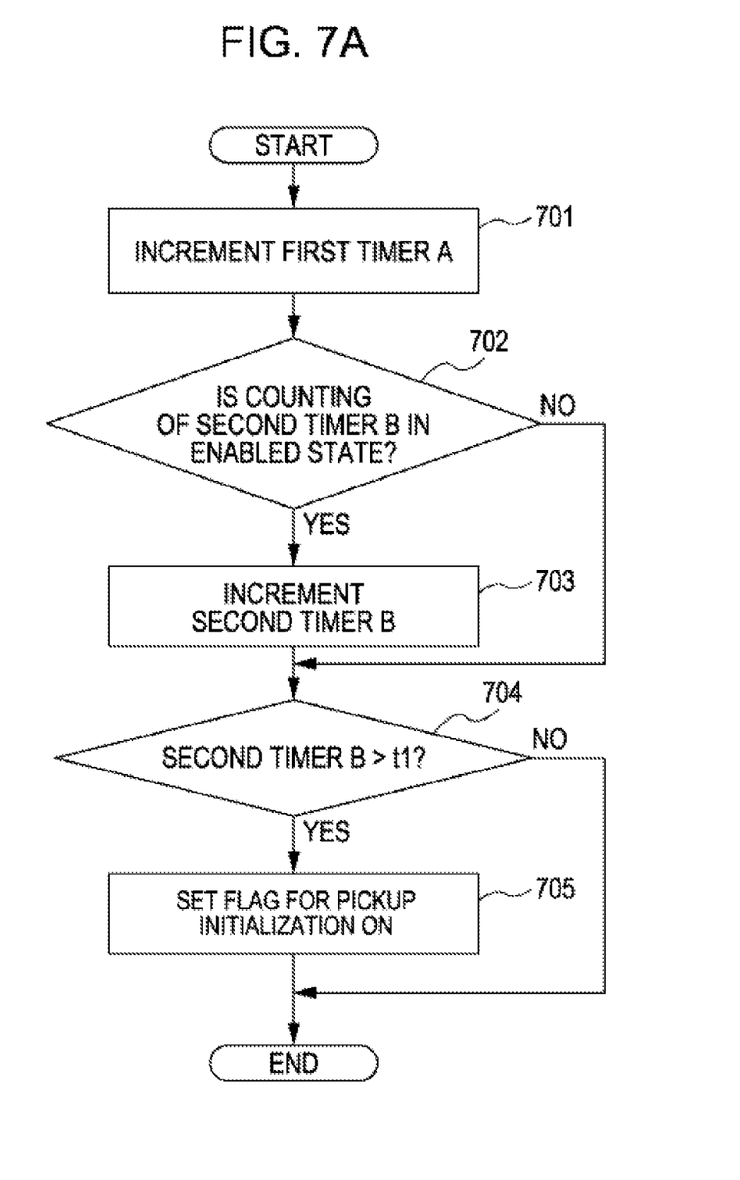
FIGS. 7A, 7B, and 7C are flow charts for describing an exemplary timer count checking process for the pickup initialization.
Figure 7B:
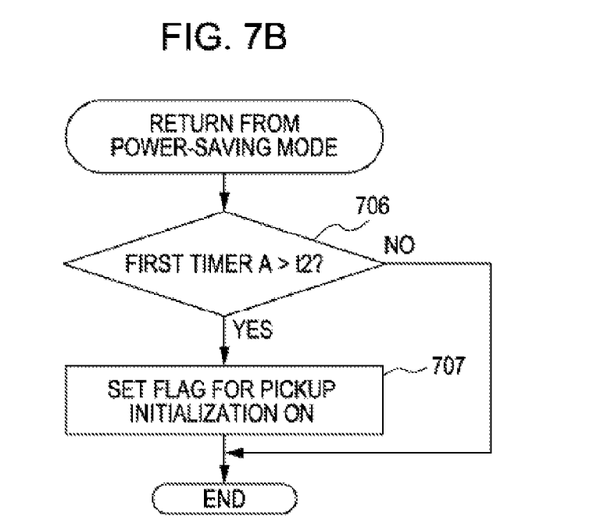

Next, exemplary timer count checking for pickup initialization will be described with reference to FIGS. 7A to 7C. When timer count checking is called in step 602 in FIG. 6, the first timer A is incremented in step 701 illustrated in FIG. 7A. Then, in step 702, it is determined whether the counting of the second timer B is in an enabled state. If it is determined that the counting of the second timer B is in an enabled state (YES in step 702), the second timer B is incremented in step 703. If it is determined that the counting of the second timer B is in a disabled state (NO in step 702), flow proceeds to step 704. In step 704, a measurement value measured by the second timer B is compared with a parameter t1 (time t1), which is the first time set to a predetermined value (e.g., 1 minute). If the measurement value of the second timer B is larger than t1 (YES in step 704), the flag for pickup initialization is set on. If the measurement value of the second timer B is not larger than t1 (NO in step 704), the process is completed without further processing.

The timer count checking for pickup initialization is also executed when the apparatus returns from the power-saving mode. In this case, as illustrated in FIG. 7B, the process from step 706 is called. In step 706, a measurement value measured by the first timer A is compared with a parameter t2 (time t2), which is the second time set to a predetermined value (e.g., 7 days). If the measurement value of the first timer A is larger than t2 (YES in step 706), the flag for pickup initialization is set on in step 707. If the measurement value of the first timer A is not larger than t2 (NO in step 706), the process is completed without further processing.

Such control performed by the controller disables execution of the pickup initialization when the first timer A is larger than t2 (the first timer A is larger than t1) in the power-saving mode. This can prevent power consumption or noise caused by unnecessary operation in the power-saving mode. In addition, the pickup initialization is not executed immediately after the soft power-off state is switched to the power-on state. The pickup initialization is not executed until the apparatus returns to the normal mode after temporarily switched to the power-saving mode. Therefore, the pickup initialization is not executed when there is less necessity for the pickup initialization, for example, when the soft power-off state is switched to the power-on state with a short time interval. Accordingly, unnecessary pickup initialization can be suppressed.

The timer count checking for the pickup initialization is also executed after a scan operation performed by the fixed reader 2, which is a flatbed scanner, is completed. In the present embodiment, the count checking is executed so as to use, as a stating point, the point in time when the close-coupled image sensor 30 returns to the initial position after the close-coupled image sensor 30 moves in the direction indicated by the arrow a1 illustrated in FIG. 3 and reads an image. However, in the case of making multiple copies, the count checking can also be executed after recording for copying is completed.

Figure 7C:
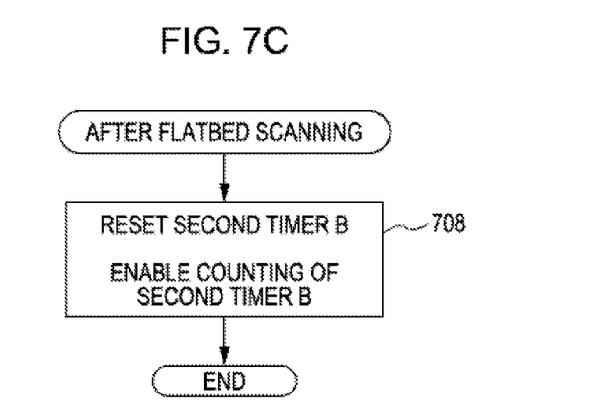

To call the count checking after the completion of flatbed scanning, the process from step 708 illustrated in FIG. 7C is called. In step 708, the second timer B is reset to zero, and the counting of the second timer B is enabled. When a scan performed by the flatbed scanner is repeated at short time intervals, the second timer B is reset each time. In the present embodiment, as described above, only when a predetermined time elapses after the last flatbed scanning, the pickup initialization is executed. Accordingly, unnecessary pickup initialization can be suppressed. Even when the pickup arm 10 is moved downward by an impact or vibration occurring when a user opens and closes the document reading and conveying unit 1 to remove a document S after flatbed scanning, the pickup roller 3 is returned to the initial position after a predetermined time elapses.

The pickup arm 10 maintained by friction may be moved and thus the position of the pickup roller 3 may be changed by an impact occurring in removal of a document after flatbed scanning or contact of the pickup arm 10 with a user occurring during long-time standby state in the power-saving mode. The position of the pickup roller 3 may also be changed when the position of the pickup arm 10 is moved downward by the weight of the pickup roller 3. However, in the present embodiment, the control described above enables the pickup initialization to be executed with a predetermined timing. Accordingly, a state easy to set a document S on the document placement tray 14 can be satisfactorily maintained.

According to the present embodiment, as described above, the automatic sheet feeding and reading apparatus includes the first timer A configured to measure an elapsed time from the completion of processing in which the close-coupled image sensor 30 of the fixed reader 2 is operated and executes the pickup initialization after a measurement value measured by the first timer A exceeds the first time t1. Therefore, the pickup initialization can be controlled without having to include a known sensor configured to detect opening or closing of a pressure plate. As a result, even when the position of the pickup roller 3 is changed by an impact caused by an opening and closing operation of the pressing plate 40 to remove a document S after the completion of reading performed by the fixed reader 2, the pickup roller 3 can be returned to the initial position after a predetermined first time t1 elapses. Consequently, according to the present embodiment, the automatic sheet feeding and reading apparatus facilitating a user to set a document can be realized at low cost. According to embodiments of the present invention, the pickup initialization is executed after a first time elapses after the completion of operation of a reading sensor of a reading portion. Consequently, the cost of the apparatus can be reduced, while at the same time a change in the position of a pickup roller caused by an impact or its own weight in a standby state can be prevented or reduced. Therefore, according to the present invention, a state easy to set a document can be satisfactorily maintained.

While the present invention has been described with reference to exemplary embodiments, it is to be understood that the invention is not limited to the disclosed exemplary embodiments. The scope of the invention is to be accorded the broadest interpretation so as to encompass all modifications and equivalent structures and functions.

This application claims the benefit of Japanese Application No. 2007-209195 filed Aug. 10, 2007, which is hereby incorporated by reference herein in its entirety.

What is claimed is:

1. An image reading apparatus, comprising:
a reading unit having a reading surface configured to read a document;
a document feeding unit including a document tray and a roller, configured to perform document feeding with respect to the reading surface, wherein the roller is capable of shifting between an initial position where the roller is apart from the document tray and a contact position where the roller contacts a one of documents stacked on the document tray, and the roller feeds the document at the contact position; and
a control unit configured to execute positional initialization of the roller by shifting the roller to the initial position, the control unit having a first timer configured to start measuring a first elapsed time in response to a completion of document reading by the reading unit and a second timer configured to start measuring a second elapsed time in response to a completion of the positional initialization of the roller, wherein,
the control unit executes the positional initialization of the roller when either when the first elapsed time exceeds a first predetermined time or when the second elapsed time exceeds a second predetermined time, and the control unit resets the second timer and makes the second timer start measuring again in response to the completion of the positional initialization, and in a case where document reading by the reading unit is performed before the first elapsed time exceeds the first predetermined time, the control unit resets the first timer and makes the first timer start measuring again in response to the completion of the document reading.

2. The image reading apparatus according to claim 1, wherein the control unit causes the first timer to suspend measuring of the first elapsed time in response to the completion of the positional initialization of the roller.

3. The image reading apparatus according to claim 2, wherein the control unit switches the image reading apparatus to a power-saving mode from a normal mode when an elapsed time from a last operation by an user exceeds a third predetermined time, and wherein the second timer continues counting during the power-saving mode, and the control unit restricts the execution of the positional initialization of the roller during the power-saving mode regardless of the second elapsed time.

4. The image reading apparatus according to claim 3, wherein, in a case where the second elapsed time exceeds the second predetermined time during the power-saving mode, the control unit controls to perform the positional initialization of the roller after the image reading apparatus returns to the normal mode from the power-saving mode.

5. The image reading apparatus according to claim 1, wherein the document feeding unit includes a separator for separating one or more documents fed by the roller one by one.

6. The image reading apparatus according to claim 1, wherein the document feeding unit includes a pressing plate and, in a closed state of the document feeding unit, the pressing plate can press a document placed stationary on the reading surface.

7. The image reading apparatus according to claim 6, wherein the reading unit is capable of reading a document placed stationary on the reading surface and reading a document fed by the document feeding unit.

8. The image reading apparatus according to claim 1, further comprising a printing unit configured to perform printing on a sheet.

* * * * *